United States Patent
Vanni

(10) Patent No.: US 8,656,827 B2
(45) Date of Patent: Feb. 25, 2014

(54) CAPSULE FOR THE PREPARATION OF A BEVERAGE AND CAPSULE-HOLDING UNIT FOR USE THEREWITH

(75) Inventor: Alfredo Vanni, Magliolo (IT)

(73) Assignee: Luigi Lavazza S.p.A., Turin (IT)

( * ) Notice: Subject to any disclaimer, the term of this patent is extended or adjusted under 35 U.S.C. 154(b) by 198 days.

(21) Appl. No.: 13/257,506

(22) PCT Filed: Mar. 18, 2010

(86) PCT No.: PCT/IB2010/051182
§ 371 (c)(1),
(2), (4) Date: Sep. 19, 2011

(87) PCT Pub. No.: WO2010/106516
PCT Pub. Date: Sep. 23, 2010

(65) Prior Publication Data
US 2012/0006205 A1    Jan. 12, 2012

(30) Foreign Application Priority Data

Mar. 20, 2009   (IT) .............................. TO2009A0216

(51) Int. Cl.
*A47J 31/06* (2006.01)
*B65D 85/804* (2006.01)
*B65D 85/816* (2006.01)

(52) U.S. Cl.
USPC .................. 99/295; 99/323; 426/77; 426/112

(58) Field of Classification Search
USPC .......................... 99/295, 323; 426/77, 84, 112
See application file for complete search history.

(56) References Cited

U.S. PATENT DOCUMENTS

| | | | |
|---|---|---|---|
| 4,860,645 A * | 8/1989 | van der Lijn et al. ............ | 99/295 |
| 4,995,310 A | 2/1991 | van der Lijn et al. | |
| 5,347,916 A * | 9/1994 | Fond et al. ....................... | 99/295 |
| 5,398,596 A * | 3/1995 | Fond ................................ | 99/295 |
| 5,913,962 A * | 6/1999 | Gasser et al. .................... | 99/293 |
| 7,213,506 B2 * | 5/2007 | Halliday et al. ................. | 99/295 |
| 7,815,953 B2 * | 10/2010 | Mastropasqua et al. ........ | 426/77 |
| 8,322,271 B2 * | 12/2012 | Glucksman et al. ............ | 99/287 |
| 2006/0196364 A1 * | 9/2006 | Kirschner ........................ | 99/295 |
| 2006/0280841 A1 * | 12/2006 | Cai ................................. | 426/77 |

FOREIGN PATENT DOCUMENTS

| | | |
|---|---|---|
| EP | 0 211 511 A1 | 2/1987 |
| EP | 0 224 297 A1 | 6/1987 |
| FR | 2 213 757 A | 8/1974 |
| FR | 2 322 796 A | 4/1977 |

* cited by examiner

*Primary Examiner* — Reginald L Alexander
(74) *Attorney, Agent, or Firm* — Sughrue Mion, PLLC

(57) ABSTRACT

The capsule (1) comprises a cup body (2), with a bottom wall (2f) on which is a separating structure (3) with a plurality of spokes (4), defined between which are corresponding interspaces (5). The bottom wall (2f) has in its central portion a plurality of drink exit openings (6) which are not aligned with the slopes (4). A first filter sheet (7) is arranged on the separating structure (3) in such a way that a plurality of brewing chambers is defined between the first filter sheet (7), the spoked structure (3) and the bottom wall (2f). A quantity of powdered or granular material (8), especially roast ground coffee, is placed in the body (2) on the filter sheet (7). The second sheet (9) of filter material is applied to a top outer edge of said body (2). In use, the pressure of the fluid injected into the capsule (1) deforms the first filter sheet (7) in such a way that it moves towards the bottom wall (2f) through the interspaces (5) between the spokes (4), while defining, along the opposite edges of each spoke (4), respective essentially radial channels or passages (10) for the drink to flow towards the openings (6) in the bottom wall (2f).

8 Claims, 6 Drawing Sheets

CAPSULE FOR THE PREPARATION OF A BEVERAGE AND CAPSULE-HOLDING UNIT FOR USE THEREWITH

CROSS REFERENCE TO RELATED APPLICATIONS

This application is a National Stage of International Application No. PCT/IB2010/051182 filed Mar. 18, 2010, claiming priority based on Italian Patent Application No. TO2009A000216 filed Mar. 20, 2009, the contents of all of which are incorporated herein by reference in their entirety.

The present invention relates in general to capsules for preparing beverages, especially coffee, of the type defined in the preamble of Claim 1.

A capsule of this kind is disclosed in EP 0 224 297 A1. The capsule in that document comprises a cup-like body with an annular ridge projecting from its bottom wall, and with a plurality of radial supporting walls extending from the side wall of said body, without reaching the annular ridge. A cup-like filter element is placed on said radial walls and is welded to the ridge of the bottom wall. Another similar capsule is disclosed in EP 0 211 511 A1.

One object of the present invention is to provide an improved capsule, suitable for use in preparing beverages, especially coffee, having excellent organoleptic properties, by injecting a liquid and/or steam under pressure.

This and other objects are achieved in accordance with the invention with a capsule having the features defined in Claim 1.

In accordance with another feature, the containment body and said spoked separating structure are conveniently made from a biodegradable plastic from renewable sources, especially polylactic acid. By means of this feature the capsule according to the present invention is not harmful to the environment.

In accordance with another feature, the abovementioned exit openings in the bottom wall of the cup-like containment body are shaped essentially like a cross.

As will be made clear by the following description, the containment body can be made in two separate parts, namely a main part comprising the side wall of the capsule and the abovementioned spoked separating structure, and an undercup forming the bottom wall, this undercup being conveniently welded to said main part.

In another embodiment the containment body may be made in one piece, as a moulding.

Other features of the capsule according to the present invention are defined in the dependent claims.

The present invention also relates to a capsule holding unit for optimal use of a capsule as defined above.

Other features and advantages of the invention will become apparent in the following detailed description, which is given purely by way of non-restrictive example, with reference to the appended drawings, in which.

Figure 1:
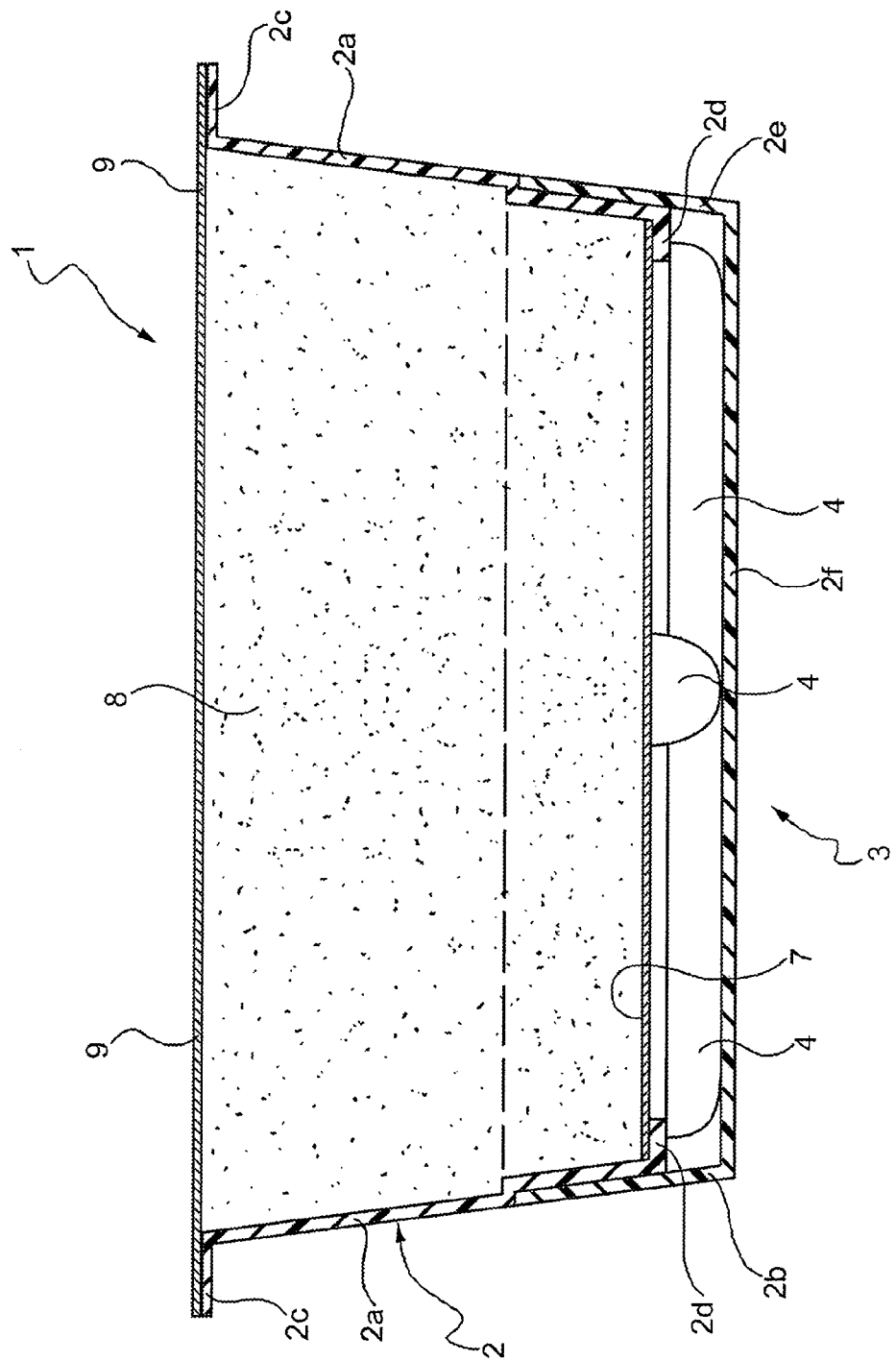
FIG. 1 is a cross section through a capsule for preparing drinks according to the present invention.

The reference 1 in the drawings is a general indication for a capsule according to the invention for preparing a drink, especially coffee, by injecting a liquid, especially water, and/or steam under pressure.

The capsule 1 comprises a cup-like containment body bearing the general reference 2.

Figure 2:
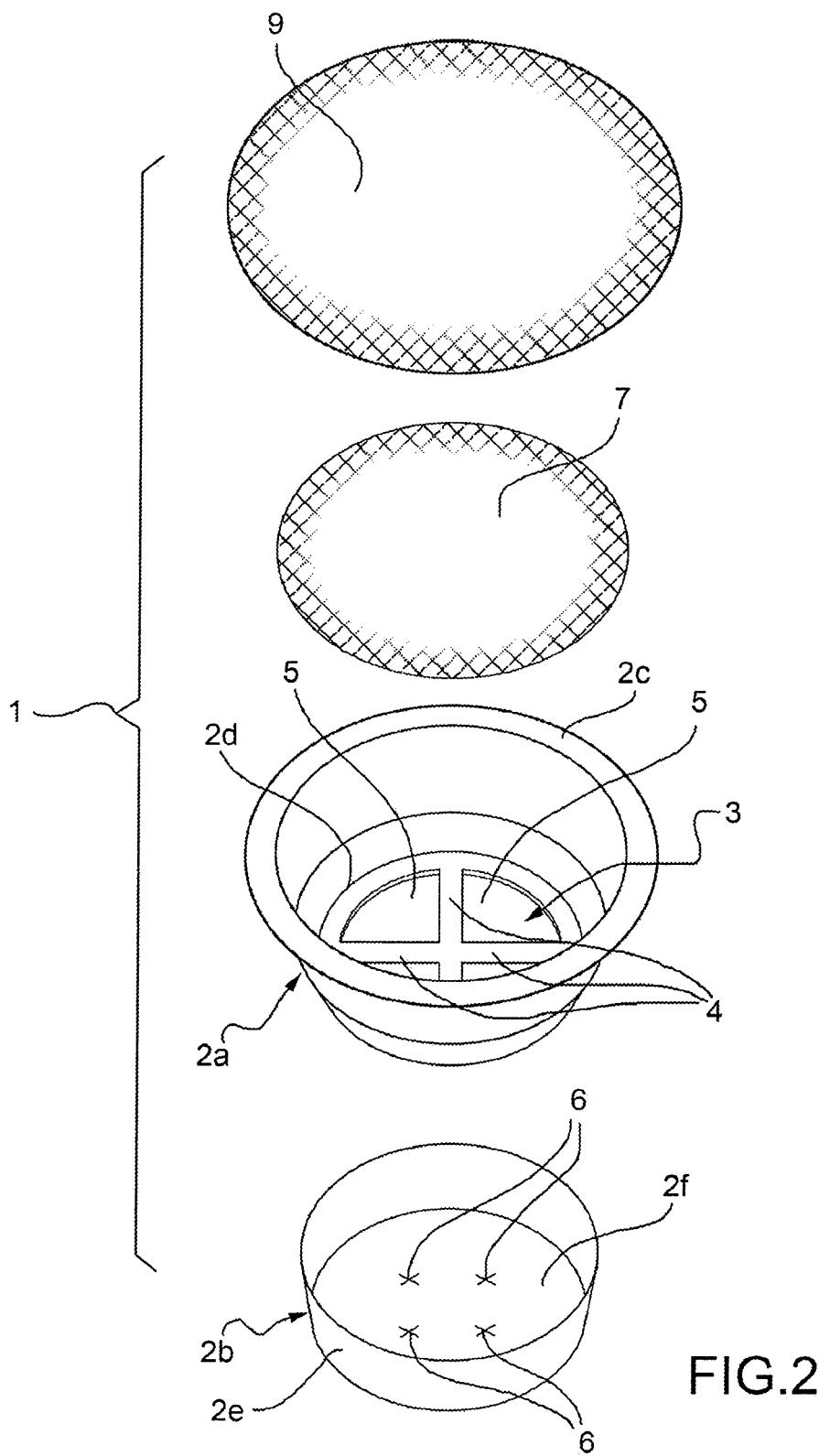
FIG. 2 is an exploded perspective view showing the structure of a capsule in a first embodiment of the present invention.
Figure 2A:
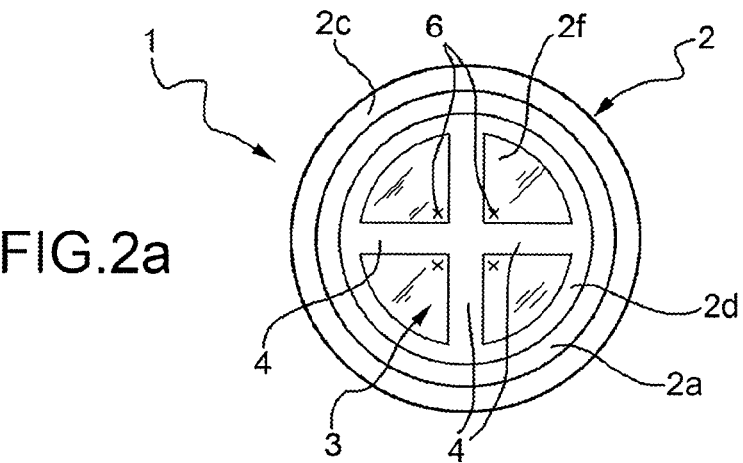
FIG. 2a is a top plan view of part of the capsule shown in FIGS. 1 and 2.

In a first embodiment, shown in FIGS. 1, 2 and 2a, the body 2 comprises a main part 2a and an undercup 2b. The main part 2a defines an annular side wall, which may be a frustum of a cone, of the capsule, and has a top flange 2c which extends radially outwards, and a lower annular flange 2d which extends radially inwards.

The main part 2a of the body 2 in its lower portion forms integrally a separating structure 3 comprising a plurality of spokes 4. This separating structure 3 preferably has three or four equally spaced spokes 4.

As seen in particular in FIG. 1, in the example of an embodiment illustrated, the spokes 4 have a cross section which tapers downwards, essentially in a semicircle, with a flat top surface essentially coplanar with the top surface of the flange 2d.

Corresponding interspaces 5, essentially in the form of sectors of a circle are defined between the spokes 4 (see FIG. 2 in particular).

The undercup 2b of the body 2 has an annular side wall 2e, which may be a frustum of a cone, and a bottom wall 2f. The central portion of the latter has a plurality of openings 6 for the drink to exit, and these, when the body 2 is assembled, are not aligned with the spokes 4 but lie under the interspaces 5 defined between the spokes. In the illustrated example of an embodiment, the bottom wall 2f has an opening 6 for each of the interspaces or sectors 5. Additionally, these openings 6 are essentially in the shape of crosses—that is, as two intersecting incisions.

Conveniently, the main part 2a and the undercup 2b of the containment body 2 are made by moulding and by thermoforming, respectively, with a plastic, preferably of biodegradable and/or compostable type, such as polylactic acid (PLA).

The undercup 2b is placed on the lower part of the main portion 2a of the containment body 2, and is then welded to it, e.g. using a sonotrode. The bottom wall 2f of this undercup can also be welded to the lower edges of the spokes 4, again by means of a sonotrode, for example.

The capsule 1 also comprises a first sheet 7 of filter material, such as filter paper, which is arranged on the separating structure 3, that is on the spokes 4, and on the inner lower flange 2d of the containment body 2 (see FIG. 1 in particular). In this way, a plurality of brewing chambers, each in an interspace 5 between the spokes 3-4, is defined between the sheet of filter material 7, the spoke structure 3-4 and the bottom wall 2f.

The sheet 7 of filter material may be welded, e.g. thermally or by a sonotrode, to the upper surfaces or faces of the spokes 4, and optionally also to the flange 2d.

As shown in FIG. 1, a quantity of a powdered or granular material 8, especially roasted ground coffee, is placed on the sheet 7 of filter material. The material may conveniently be pressed, at a pressure of for example between 2 and 50 kg per square centimetre of the average cross section of the capsule.

Reference 9 denotes a second sheet of filter material, such as filter paper, applied and welded to the top outer flange 2c of the containment body 2.

Figure 3:
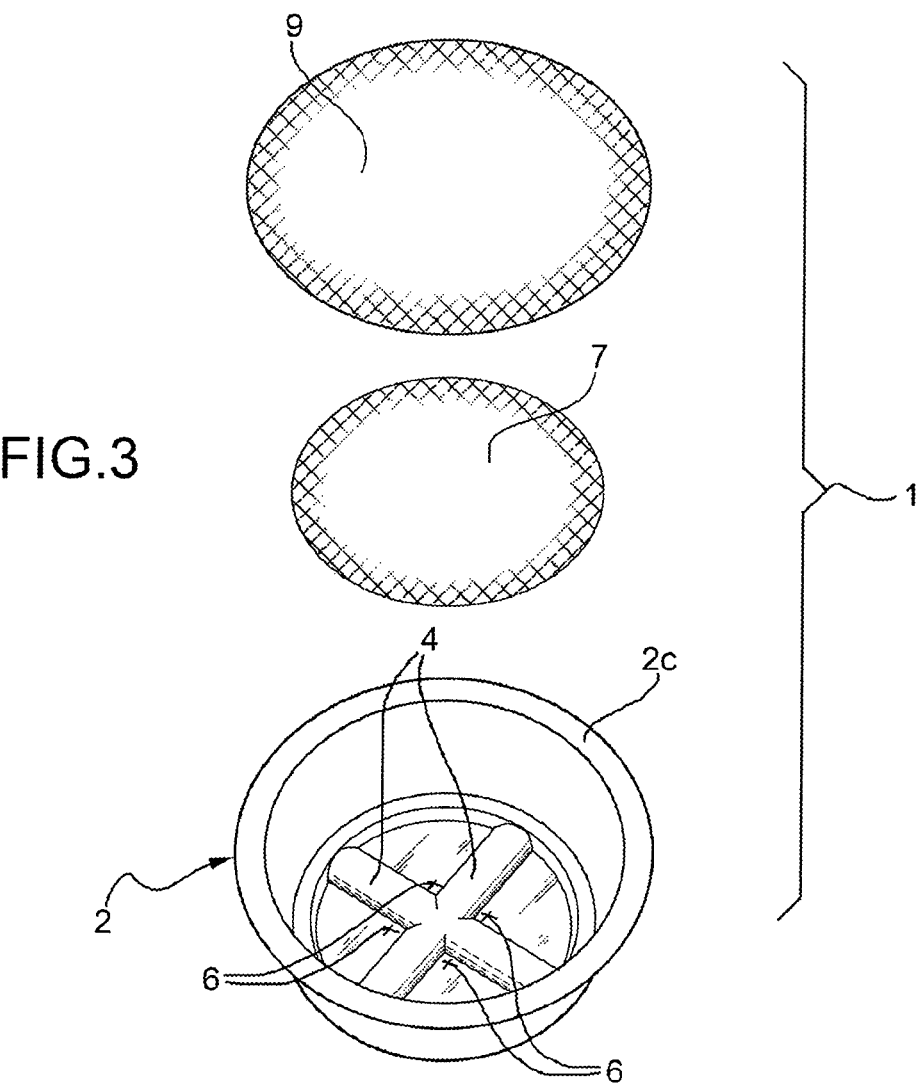
FIG. 3 is an exploded perspective view showing another embodiment of a capsule according to the present invention.

FIG. 3 shows another embodiment of a capsule 1 according to the present invention. In this embodiment the containment body 2 is made integrally as a single plastic moulding, preferably in a biodegradable and/or compostable plastic, such as polylactic acid.

The form of the containment body 2 in the embodiment shown in FIG. 3 corresponds morphologically to the result of joining together the main part 2a and the undercup 2b of the embodiment shown in the preceding figures.

For the rest, the capsule 1 shown in FIG. 3 corresponds essentially to the capsule described with reference to FIGS. 1 to 2a, except that the spokes 4 are preferably tapered upwards in cross section to avoid undercuts which would make the mould tooling more complicated.

In use, a drink is prepared by injecting (in a manner known per se) a liquid (water) and/or steam under pressure into the capsule 1 through the top sheet of filter material 9.

Figure 4:
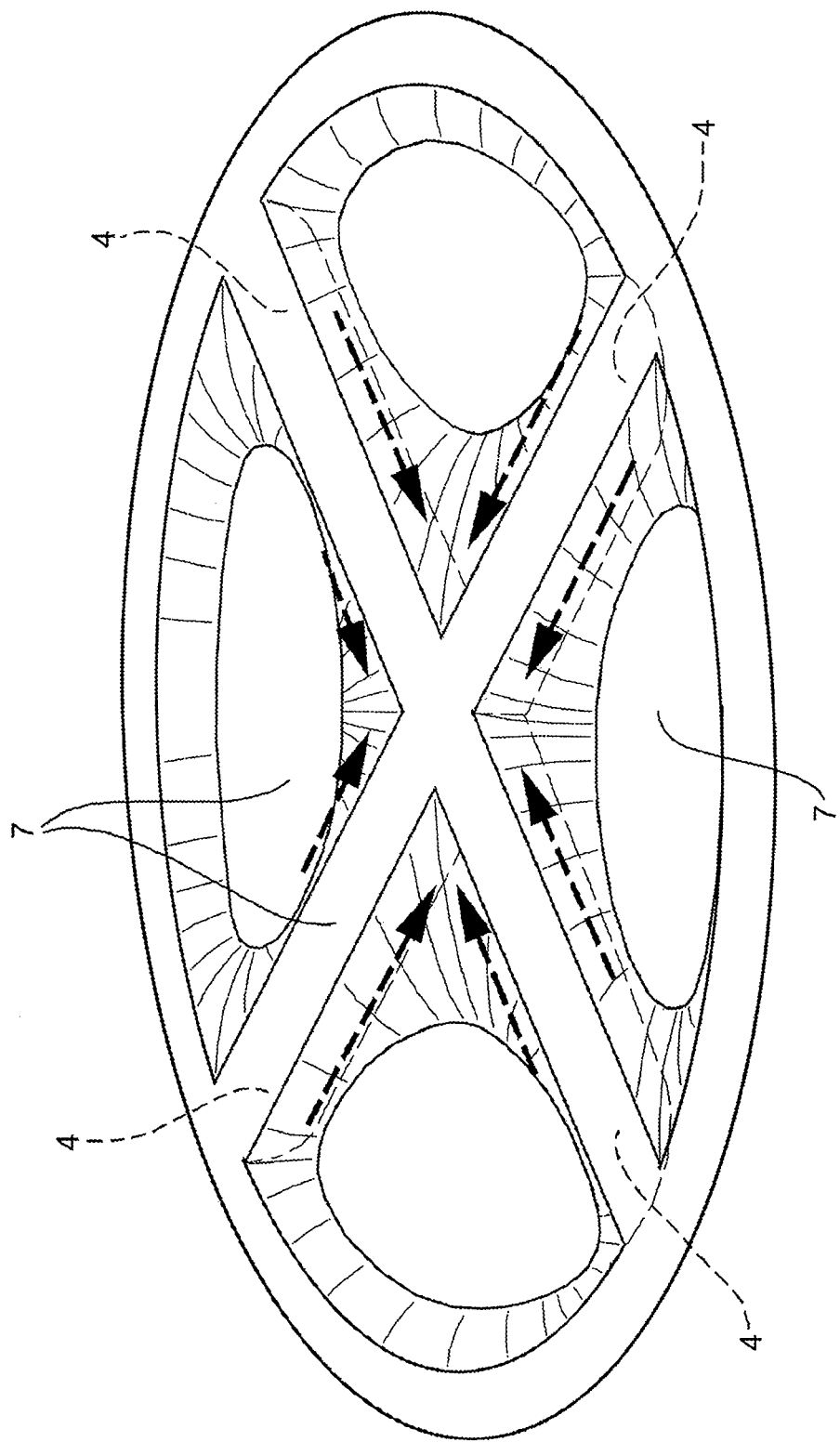
FIG. 4 is a perspective view on an enlarged scale showing the operational deformation of a sheet of filter material arranged on the spoked separating structure in a capsule according to the invention.
Figure 5:
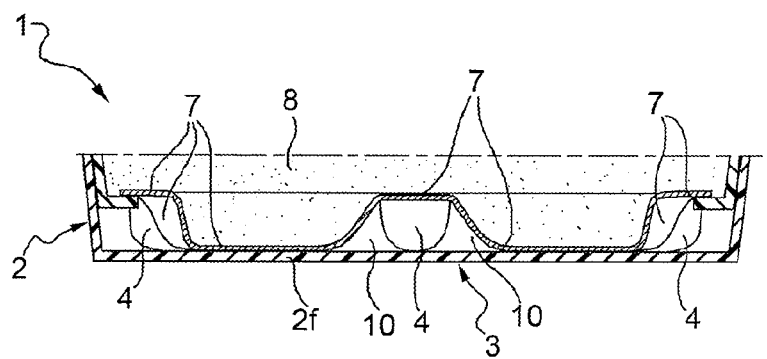
FIG. 5 is a partial section through a capsule according to the invention in the deformed condition of said sheet of filter material, the section being taken essentially on the line V-V in FIG. 1.

Because of the pressure of this fluid acting on the cake of powdered or granular material 8, the lower sheet of filter material 7 deforms, and in particular is stretched, substantially as shown in FIG. 4: the portions of this sheet which lie over the interspaces between adjacent spokes 4 of the separating structure "sag" downwards, tending to approach the bottom wall 2f of the body 2 of the capsule. As a result, a plurality of essentially radial microchannels or passages are defined along the opposite edges of each spoke 4, as shown at 10 in FIG. 5, and convey the flow of brewed beverage or drink essentially as shown by the dashed arrows in FIG. 4, towards the central part of the bottom wall 2f of the capsule, and therefore towards the exit openings 6 of the latter.

As noted earlier, the capsule according to the invention may conveniently be made from a biodegradable and/or compostable polymeric material derived from renewable sources. By contrast, the capsules currently in use are made of non-biodegradable materials derived from non-renewable sources, such as synthetic polymers made from petroleum, or aluminium. After use, the used capsules of the prior art represent a potential threat to the environment as they are not biodegradable.

The use of polylactic acid to produce a capsule for preparing a drink does involve the adoption of special arrangements in view of its particular rheological properties, and in particular its thermomechanical properties. Specifically, polylactic acid tends to soften at temperatures of around 55-60° C. In view of this property, and the high pressures to which a capsule for preparing a drink is subjected in use, the use of polylactic acid would appear somewhat doubtful because this material softens during dispensing and tends to occupy whatever volumes it finds available inside the brewing appliance, possibly leading to decompaction of the mass or cake of powdered or granular material contained inside the capsule.

The peculiar structure of the capsule according to the invention, as described above, is such as to allow the use of polylactic acid for its manufacture, giving the advantage of complete biodegradability.

When used to brew a hot drink, the material of the bottom wall of the capsule will begin to undergo heat-related relaxation, increasing with percolation time, which essentially results in a gradual increase in the cross section of the outflow openings 6 through which the drink discharges. The properties of the resulting drink can therefore be modified by changing the set percolation time. For instance, with relatively short percolation times an excellent espresso coffee can be obtained, while with longer percolation times it is possible to obtain an excellent filter coffee or so-called Americano.

The capsule of the present invention can conveniently be used in a capsule holding unit essentially as known per se, comprising a classic microperforated bottom screen.

Figure 6:
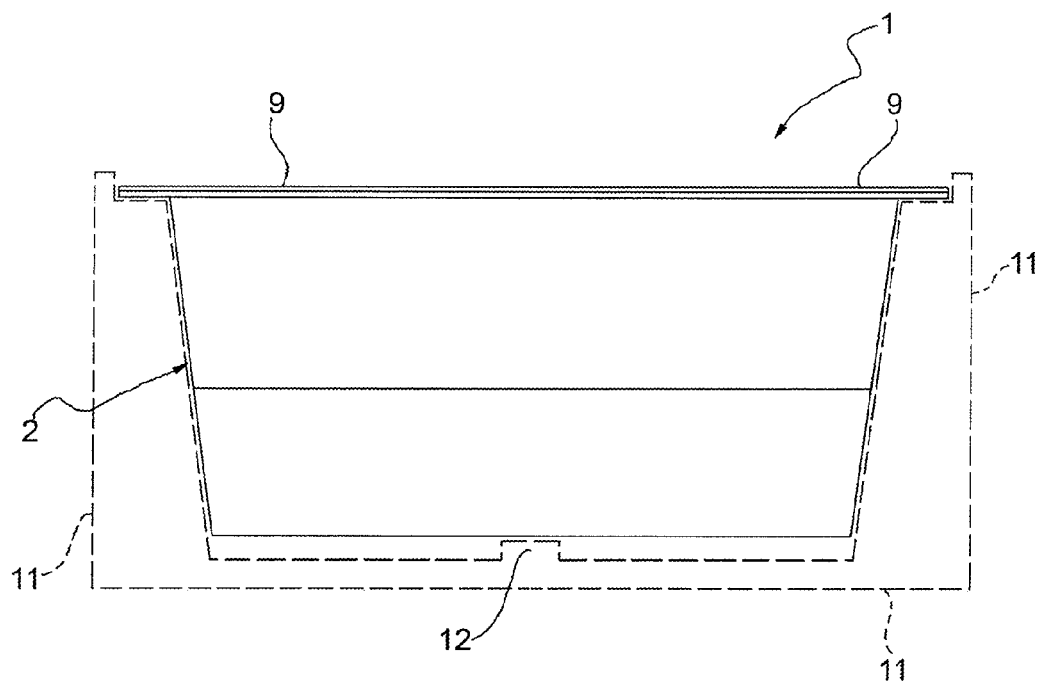
FIG. 6 is a view showing a capsule and an associated capsule holding unit according to the invention.

In FIG. 6 a capsule holding unit of this type is shown diagrammatically and marked 11. Advantageously, a central ridge 12 is made on the bottom of this unit to support the centre of the bottom of a capsule 1, particularly the central connecting area between the spokes 4, in order to counteract its softening due to the temperature and pressure of the fluid injected into the capsule.

Figure 7:
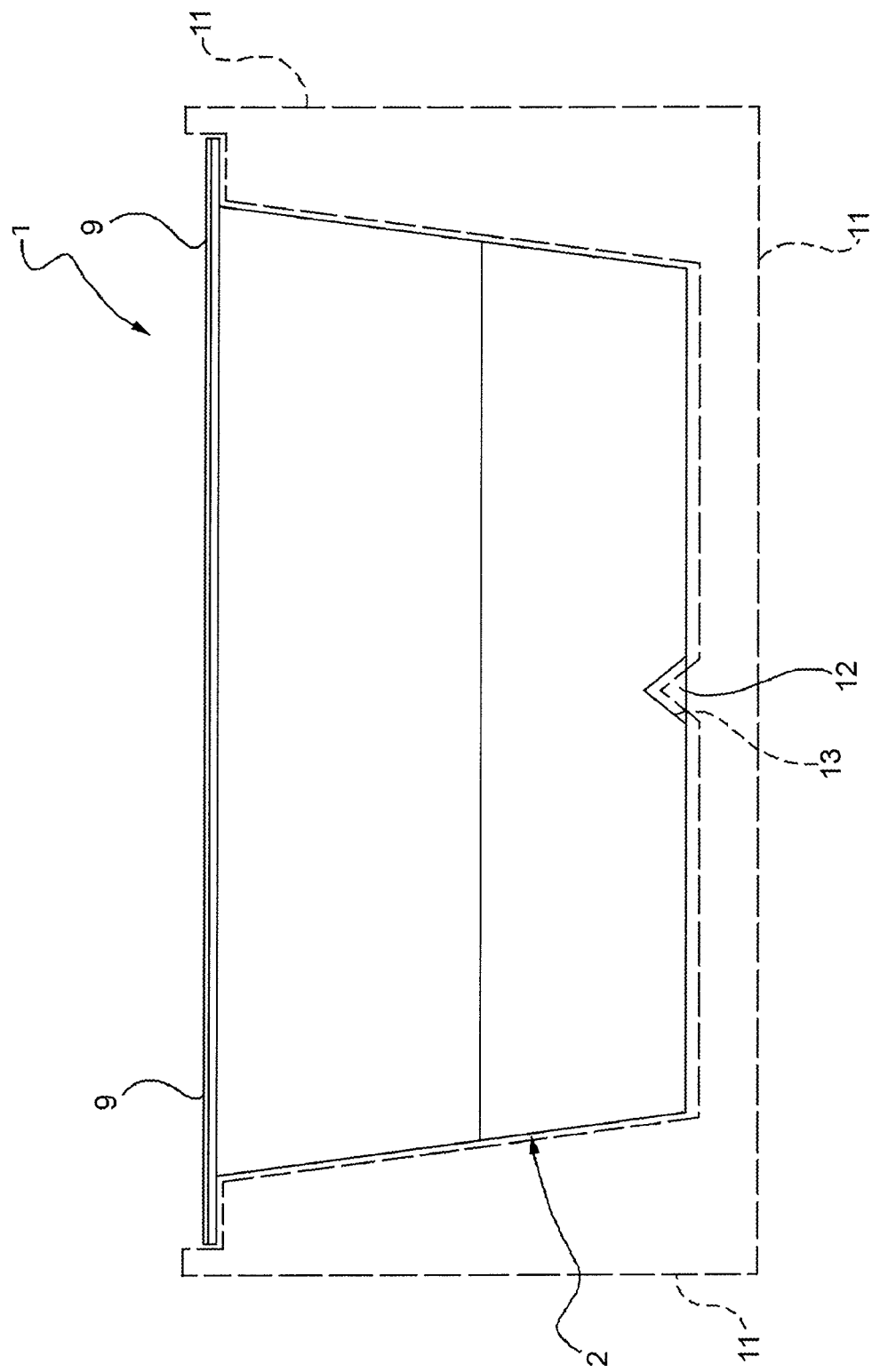
FIG. 7 is analogous to FIG. 6 and shows a variant.

FIG. 7 shows a variant in which a seat 13 is formed in the bottom wall 2f of the capsule, in which a ridge 12 on the capsule holder 11 can be engaged to provide mutual centring.

Clearly, without departing from the principle of the invention, the embodiments and details of construction can differ widely from those described and illustrated purely by way of non-restrictive example, without thereby departing from the scope of the invention as defined in the accompanying claims.

The invention claimed is:

1. Capsule (1) for preparing a beverage, especially coffee, comprising
   a cup shaped containment body (2) with a bottom wall (2f), above which is a separating structure (3) with a plurality of at least approximately radial elements (4), defined between which are corresponding interspaces (5); the bottom wall (2f) having in its central portion a plurality of beverage exit openings (6);
   a first sheet (7) of filter material arranged on said separating structure (3);
   a quantity of powdered or granular material (8), especially roast ground coffee, optionally pressed, arranged in the containment body (2) on top of said first sheet (7) of filter material and
   a second sheet (9) of filter material applied to a top outer edge of said body (2);
   wherein:
   said at least approximately radial elements are in the form of spokes (4) which extend from the centre of said bottom wall (2f) towards its perimeter, in such a way that, between said first sheet (7) of filter material, the spokes (4) and said bottom wall (2f), a plurality of mutually separated brewing chambers is defined;
   said exit openings (6) not being aligned with said spokes (4); and
   the arrangement being such that, in use, a fluid injected at pressure into the capsule (1) is able to deform said first filter sheet (7) in such a way that it makes contact with the bottom wall (2f) through the interspaces (5) between the spokes (4), while defining, along the opposite edges of each spoke (4), respective essentially radial channels or passages (10) for the beverage to flow towards the openings (6) in the bottom wall (2f),
   wherein the containment body (2) comprises a main part (2a) forming the side wall of the capsule and said spoked (4) separating structure (3), and an undercup (2b) sealed to the underside of said main part (2a).

2. Capsule according to claim 1, in which said cup-like containment body (2) is made in one piece.

3. Capsule according to claim 1, in which each of the spokes (4) is tapered in cross section.

4. Capsule according to claim 1, in which the containment body (2) is made from a biodegradable polymer, especially polylactic acid.

5. Capsule according to claim 1, in which the abovementioned openings (6) in the bottom wall (2f) comprise a plurality of incisions, and are preferably cross-shaped.

6. Capsule according to claim 1, in which the bottom wall (2f) is of a material whose thermo mechanical properties are such that, in use, the cross section of said beverage exit openings (6) is variable as a function of percolation time and/or temperature.

7. Capsule according to claim 1, in which at least one seat (13) suitable for fitting onto a centring ridge formation (12) in a capsule holding unit (11) is formed in the bottom wall (2f).

8. Capsule holding unit for use with a capsule (1) according to claim 1, characterized in that it comprises a wall operationally designed to engage with the bottom wall (2f) of a capsule (1), and having a central ridge formation (12) designed to contact and support the central part of said bottom wall (2f) of the capsule (1) and the central part of said spoked (4) separating structure (3).

\* \* \* \* \*